May 25, 1965 P. E. VEGA 3,184,882

MAGNETIC TOY BLOCKS

Filed Sept. 5, 1962

PAUL E. VEGA
INVENTOR.

BY William P. Green
ATTORNEY

United States Patent Office 3,184,882

Patented May 25, 1965

3,184,882

MAGNETIC TOY BLOCKS

Paul E. Vega, 6618 Bellingham Ave., North Hollywood, Calif.

Filed Sept. 5, 1962, Ser. No. 221,538
6 Claims. (Cl. 46—25)

This invention relates to an improved type of toy block structure, designed to enable magnetic attachment of a series of blocks together in any of numerous relative positions.

There have been designed in the past various magnetic block arrangements, but each of these has had certain distinct disadvantages acting to limit the versatility of the blocks in building multiblock structures of different configurations. More particulraly, prior magnetic blocks have been so designed that their magnetic faces cannot be connected together except in certain predetermined very limited relationships, with the result that, in view of these required relationships between successive blocks, a series of blocks cannot possibly be arranged in as many different overall configurations as might be desired.

The general object of the present invention is to overcome the above discussed limitation of prior magnetic block designs, and in particular to provide a type of block which can be secured magnetically to another similar block in any relative orientation in which the peripheral edges of the blocks are aligned with one another. It is contemplated that the invention may be applied to blocks whose outer faces are of any essentially polygonal shape, preferably forming a regular or equilateral polygon, and having at least three peripheral edges or sides. In most instances, the blocks are of the usual cube shape, having essentially square faces defined by four peripheral edges.

In magnetically securing one block to an adjacent block, the two meeting faces of the blocks are capable of adhering to one another in any position in which the peripheral edges of one of the meeting faces are aligned with the peripheral edges of the other meeting face, regardless of which edge of one face meets which of the various edges of the other face. Thus, the blocks may be turned to a series of different relative positions, and adhere together in all of these positions. In prior magnetic blocks, two such faces have been capable of adhering together only when certain particular edges of the faces are opposite one another, and not when certain other edges of the faces are opposite one another and in alignment.

The above and other features and objects of the present invention will be better understood from the following detailed description of the typical embodiment illustrated in the accompanying drawing, in which.

Figure 1:
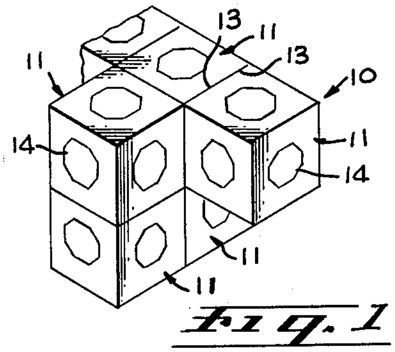
FIG. 1 is a perspective view showing a plurality of blocks embodying the invention and held together magnetically.

Referring first to FIG. 1, I have illustrated at 10 in that figure a number of typically identical toy blocks 11 formed in accordance with the invention. Each of these blocks preferably takes the form of a cube having six identical square sides or faces 12 meeting along edges 13. Each of the faces 12 is in a plane which is parallel to an opposite face of the same block, and is perpendicular to the other four faces.

Figure 2:
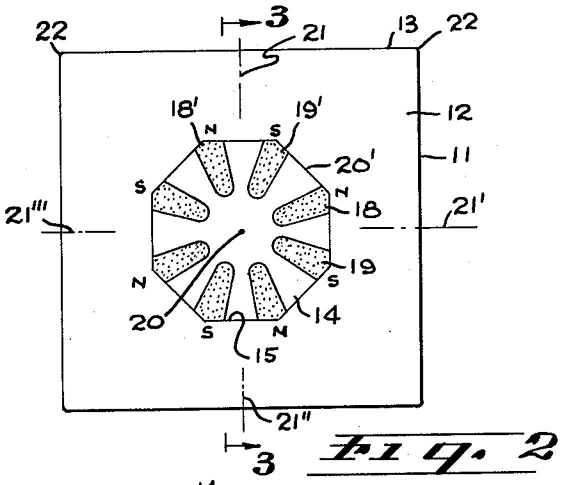
FIG. 2 is a plan view of one of the faces of one of the blocks of FIG. 1.

FIG. 2 illustrates one of the six faces 12 of one of the blocks, and the four peripheral edges 13 defining this face. All of the four edges 13, which form the square configuration of face 12, are of course desirably of the same length, and the face may therefore be described broadly as a regular polygon, or equilateral polygon.

Figure 3:
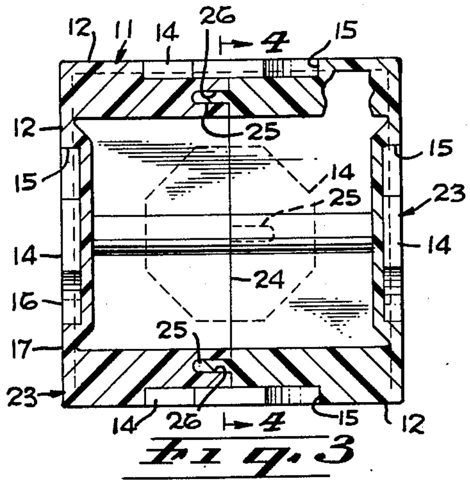
FIG. 3 is a transverse section taken on the line 3—3 FIG. 2.
Figure 4:
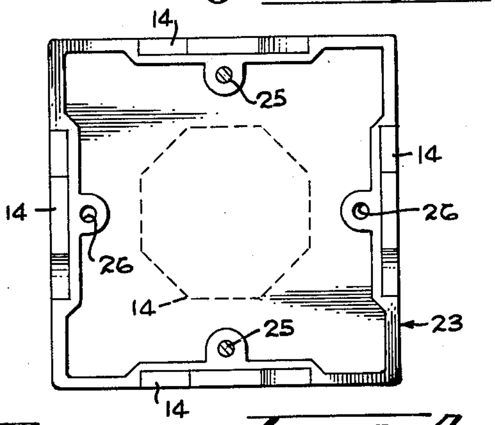
FIG. 4 is a section taken on line 4—4 of FIG. 3.

In the center of each face 12, there is carried a one piece permanent magnet element 14, which may have the octagonal cross sectional configuration illustrated in FIG. 2, and is received within a correspondingly octagonal recess 15 formed in face 12, to effectively locate element 14 in a predetermined position relative to the block surface. The outer face 16 of element 14 (FIG. 3) may be planar, and flush with outer surface 17 formed by the rest of face 12. Thus, the surface 16 of the magnetic element forms in effect a portion of, or continuation of, surface 17 of the main body of the block.

Magnetic element 14 is permanently spot magnetized in a manner forming on this element, at its outer surface 16, a series of north and south magnetic poles 18 and 19 (FIG. 2). These poles may be arranged in a generally annular pattern, about the center 20 of face 12, and are desirably all of equal magnetic strength, and located equal distances from center 20. In the presently preferred arrangement, the poles 18 and 19 are located at the eight corners respectively formed by the intersection of the eight outer faces 20' of element 14. The poles may be elongated, as illustrated, and extend essentially radially with respect to the center 20. In order to enable the use of a single magnetic element 14 of the above discussed type, having a series of alternate north and south poles, the element 14 may be a ceramic magnet, since such ceramic magnets are capable of being easily spot magnetized.

It is noted that, in FIG. 2, there is associated with each of the peripheral edges 13 of face 12 of the block, a pair of magnetic poles, one of which is a north pole, and the other of which is a south pole. For instance, there are associated with the top edge of the face shown in FIG. 2, two north and south poles 18' and 19'. These two poles are positioned symmetrically with respect to a plane 21 which extends through center 20, and is perpendicular to upper edge 13 at its center. That is, poles 18' and 19' are located equal distances from plane 21, and at its opposite sides. Also, poles 18' and 19' are spaced equal distances from the corresponding upper edge 13 of face 12, and from the two opposite ends 22 respectively of that edge 13.

The two poles 18 and 19 associated with each of the other peripheral edges 13 of face 12 in FIG. 2 are orientated with respect to the corresponding edge 13, and with respect to a plane 21', 21'', or 21''', corresponding to the discussed plane 21, in exactly the same orientation outlined in detail with respect to the two top poles 18' and 19' of FIG. 2. For instance, in FIG. 2, the two right hand poles 18 and 19 are orientated with respect to the right hand edge 13 in the same manner as are upper poles 18' and 19' orientated with respect to top edge 13; and the same thing is true of the two lower poles and the associated bottom edge 13, and the two left hand poles 18 and 19, and the associated left hand edge 13. It is noted specifically that, if each edge and the two corresponding poles are viewed with that particular edge in the upper position in which top edge 13 is illustrated in FIG. 2, then the north pole in each instance is always offset to the same side of plane 21 or its equivalent, and the south pole is always offset to the opposite side of that plane. This arrangement may be reversed, so that the south pole is at the left side and the north pole at the right, but if it is reversed it must be reversed for all of the various pairs of poles, to assure a uniform orientational relationship between all of the pairs of poles and the associated edges 13.

It is contemplated that the main bodies of the blocks may be formed of wood, or of any other convenient material, such as a pair of molded resinous plastic halves 23 meeting and cemented together at a central plane 24. Each of the halves 23 may have a pair of pin or projection portions 25 adapted to be received within a pair of recesses 26 in the other section, to accurately locate the two halves relative to one another upon assembly. The six magnetic elements 14 may be cemented within their recesses 15 formed in the outer surfaces of the two section block.

In now describing the manner of use of the set of blocks of FIG. 1, it is noted that any of the six faces of any one of the blocks may be moved into proximity to any of the six faces of any other one of the blocks, and the magnetic attraction between the two elements 14 in those faces will then effectively secure the blocks together. Further, the two faces will adhere together in any of four different relative positions, in each of which the peripheral edges 13 of one face 12 are held in alignment with or exactly opposite the edges 13 of the other face. In each of these four positions, the north poles formed in one of the faces are exactly opposite the south poles of the other face. If an attempt is made to turn one of the blocks about an axis extending through the centers 20 of the two engaged faces, the magnetic attraction will resist such turning and return the faces to a condition in which their peripheral edges 13 are aligned with one another. However, if the blocks are turned through 90 degrees, then each pair of poles 18 and 19 of one face will attract a second pair of poles on the opposite face, to hold the two faces together in that 90 degree turned position. The same is true if one block is turned through 180 degrees or 270 degrees with respect to the other block. In this way, the blocks are held together in all positions in which their edges are in proper alignment, but will not adhere together in intermediate positions. Further, this optimum type of attraction occurs between any one of the six faces of any block, and any one of the six faces of any other block. Thus, an absolute maximum of versatility is attained by the blocks, in enabling them to fit together in a maximum number of possible relationships. In this connection, it is noted that, if desired, some of the blcoks may have less than six faces magnetized, if desired for reducing the cost of the set of blocks.

Figure 5:
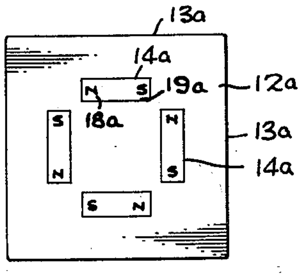
FIG. 5 is a view similar to FIG. 2, but shownig a different pole arrangement.

FIG. 5 is a view similar to FIG. 2, showing one of the six faces 12*a* of a second type of toy block, which may be considered as essentially the same as that of FIG. 2 except that the four sets of magnetic poles 18*a* and 19*a*, associated with the four peripheral edges 13*a* respectively, are formed by four separate bar magnets 14*a* embedded within and flush with surface 12*a*. The orientation of the north and south poles is essentially the same as in FIG. 2, so that two such faces will adhere together in any of four different positions in which edges 13*a* of the two faces are aligned, but not in any intermediate positions.

Figure 6:
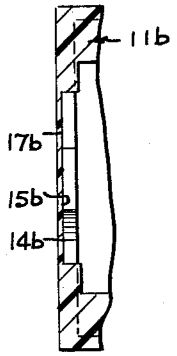
FIG. 6 is a sectional view similar to a portion of FIG. 3, but showing a variational form of the invention.

FIG. 6 shows another type of block 11*b* carrying six magnets 14*b* of the same type illustrated in FIG. 2, but in which the magnets are carried within recesses 15*b* formed in the inner surfaces of the six block walls 17*b*, rather than in the outer surfaces of the walls. In this case, the plastic walls 17*b* at the outside of the magnets must of course be thin enough to allow the magnets of two different blocks to come into close enough proximity to secure the blocks together.

Figure 7:
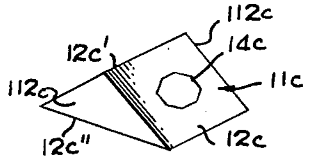
FIGS. 7 and 8 are perspective views of two additional types of blocks embodying the invention.

FIG. 7 shows a form of the invention in which each of the blocks 11*c* has two parallel opposite end surfaces or faces 112*c* of identical triangular configuration, and interconnected by three rectangular faces 12*c*, 12*c'*, and 12*c''*. Two of these faces (12*c* and 12*c'*) may be square, and of a size corresponding exactly to one of the faces 12 of the FIG. 1 blocks, and containing a magnet 14*c* corresponding to magnet 14 of FIG. 1, so that any of the square faces 12 of the FIG. 1 blocks may adhere to either of the square faces 12*c* or 12*c'* of FIG. 7.

Figure 8:
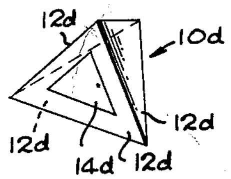
Figure 9:
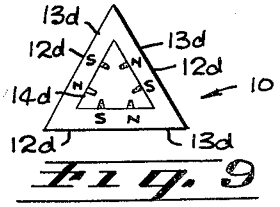
FIG. 9 is a view showing in elevation one of the faces of the FIG. 8 block.

FIGS. 8 and 9 show another form of the invention, in which all of the sides or faces 12*d* of each block 10*d* are of identical triangular shape, with the three peripheral edges 13*d* of each triangle being of equal length, to form an equilateral triangle. A ceramic magnet 14*d* is mounted in and flush with each of the surfaces 12*d*, and has a pair of north and south poles 18*d* and 19*d* associated with and located opposite the centers of each of the sides 13*d*. As in FIG. 2, each of the pairs of poles 18*d* and 19*d* is located in the same orientation with respect to the corresponding edge 13*d* as is each of the other pairs of poles with respect to its corresponding edge. As a result, two blocks of the type shown in FIGS. 8 and 9 are capable of adhering together magnetically in any position in which one of the planar faces 12*d* of one block is located against any face of the other block, so long as the edges 13*d* of one face are opposite and aligned with the edges 13*d* of the other face. In this way, each pair of faces will adhere together in any of three predetermined positions, but not in any intermediate relative positions.

I claim:

1. A set of toy blocks each having the shape of essentially a cube with six similar faces, said blocks including means forming magnetic poles in at least one face of each of a plurality of said blocks so that a pair of the blocks may be secured together magnetically with any two of the last mentioned faces in proximity and with the edges thereof in alignment, individual ones of said faces being essentially square and being defined essentially by four main peripheral edges of essentially equal length, said magnetic poles of a particular face including four pairs of north and south poles, said pairs being associated respectively one with each of said edges of said particular face, the north pole of each of said different pairs of poles being in essentially the same orientation with respect to the south pole of that pair and with respect to the associated one of said peripheral edges, both as to spacing from said edge and orientation with respect to the extremities thereof, as are all others of said north poles with respect to the south pole with which they are paired and with respect to their associated edges, said magnetic poles of each said pair thereof being positioned symmetrically at opposite sides of a plane which extends perpendicularly through the center of the associated one of said peripheral edges.

2. A set of toy blocks as recited in claim 1, in which said pole forming means include a one piece body of magnetic material in one of said faces locally magnetized at a plurality of different areas to form on said single body all four of said pairs of north and south poles in that face.

3. A set of toy blocks as recited in claim 1, in which said pole forming means include a one piece body of magnetic material embedded in a recess in one of said faces and locally magnetized at a plurality of different areas to form on said single body all four of said pairs of north and south poles in that face, said poles in said body forming a generally annular pattern of magnetic poles therein.

4. A set of toy blocks as recited in claim 1, in which said pole forming means include a one piece body of ceramic magnetic material in one of said faces locally magnetized at a plurality of different areas to form on said single body all four of said pairs of north and south poles in that face.

5. A set of toy blocks as recited in claim 1, in which at least some of said blocks have said four pairs of north and south poles formed in each of the six faces thereof.

6. A set of toy blocks having faces movable into proximity, and including means forming magnetic poles in said faces for securing a pair of the blocks together, individual ones of said faces being of essentially regular polygonal configuration and being defined essentially by a series of at least three main peripheral edges of essentially equal length, said poles including a number of pairs of north and south poles equal to the number of said main peripheral edges, said pairs being associated with different ones of said edges respectively, the north pole of each of said different pairs of poles being in essentially the same orientation with respect to the south pole of said pair and with respect to the associated one of said peripheral edges, both as to spacing from said edge and orientation with respect to the extremities of the edge, as are all others of said north poles with respect to the south poles with which they are paired and the associated peripheral edges, said magnetic poles of each said pair thereof being positioned symmetrically at opposite sides of a plane which extends perpendicularly through the center of the associated one of said peripheral edges.

References Cited by the Examiner

UNITED STATES PATENTS

| | | | |
|---|---|---|---|
| 2,389,298 | 11/45 | Ellis | 46—241 X |
| 2,570,625 | 10/51 | Zimmerman et al. | 46—24 |
| 2,795,893 | 6/57 | Vayo | 46—241 |
| 2,939,243 | 6/60 | Duggar | 46—24 |
| 2,964,793 | 12/60 | Blume | 63—29 |

FOREIGN PATENTS

| | | |
|---|---|---|
| 726,328 | 3/55 | Great Britain. |
| 1,266,319 | 5/61 | France. |
| 552,740 | 12/56 | Italy. |

RICHARD C. PINKHAM, *Primary Examiner.*